United States Patent [19]

Malarkey

[11] 4,068,193

[45] Jan. 10, 1978

[54] GAS LASER SYSTEM

[75] Inventor: Edward C. Malarkey, Severna Park, Md.

[73] Assignee: Westinghouse Electric Corporation, Pittsburgh, Pa.

[21] Appl. No.: 680,252

[22] Filed: Apr. 26, 1976

[51] Int. Cl.² .............................................. H01S 3/22
[52] U.S. Cl. ........................................... 331/94.5 G
[58] Field of Search ................... 331/94.5 G; 330/4.3

Primary Examiner—William L. Sikes
Assistant Examiner—Marcus S. Rasco
Attorney, Agent, or Firm—M. P. Lynch

[57] ABSTRACT

A gas laser system utilizing a mixture of water vapor and hydrogen deuteride wherein molecular vibrations are excited in the hydrogen deuteride in an electric discharge and the vibrational energy is stored until, by means of near-resonant energy exchange collisions, it is transferred to the active laser water molecules. Laser action occurs at about 4.6 microns with a theoretical efficiency of about 58%.

6 Claims, 2 Drawing Figures

GAS LASER SYSTEM

BACKGROUND OF THE INVENTION

As is known, gas lasers have been developed in the past wherein one gas in its metastable vibrational level can be used to selectively populate an upper level of another gas through resonant transfer via inelastic collisions. One such system is described in Patel U.S. Pat. No. 3,411,105 wherein the vibrational energy of nitrogen is transferred to carbon dioxide, the active laser medium. Other systems of this type using polyatomic molecules as the active medium are disclosed in Byrne U.S. Pat. No. 3,605,038.

In the carbon dioxide-nitrogen laser, for example, an electric discharge in a mixture of these gases results in collisions of electrons with nitrogen molecules, thereby exciting them vibrationally. The cross section for these excitation processes is quite high. Since the nitrogen molecule, like all homonuclear diatomic molecules, possesses no intrinsic electric dipole moment in any of its vibrational states, relaxation of vibrationally excited nitrogen via emission of radiation is impossible. An excited nitrogen molecule, therefore, retains its excess energy until it gives it up by collision which can be either with a container wall or with some other molecular species.

It happens that the first excited vibrational state of nitrogen which lies at 2331 $cm^{-1}$ above the ground vibrational state, coincides almost exactly in energy with the first excited state of the asymmetric stretching vibration of carbon dioxide at 2349 $cm^{-1}$. Because of this near coincidence, excited nitrogen molecules can, upon collision with unexcited carbon dioxide molecules, efficiently transfer their energy to the carbon dioxide molecules, leaving the latter in the first excited state of the asymmetric stretch vibration. Since this excitation occurs preferentially, the first excited state of carbon dioxide becomes populated while the lower lying states remain unpopulated. As a result, a population inversion, much like that in a four-level laser, is immediately created with energy being released in the form of coherent light. Laser action is usually observed in a carbon dioxide-nitrogen laser at 10.6 microns; however, by proper cavity construction, efficient laser action can also be observed at 9.6 microns.

Although laser action will occur in carbon dioxide-nitrogen mixtures without the addition of other gases, the addition of helium or some other noble gas to the mixture increases the efficiency markedly. The helium or other noble gas acts to slow down the rate of energy loss from excited nitrogen atoms by wall collisions, moderates the energy of the discharge electrons, increases the nitrogen excitation efficiency, and spreads the discharge more uniformly throughout the active medium. Efficiencies as high as 31% have been observed in electric discharge pumped carbon dioxide-nitrogen-helium lasers, the maximum theoretical efficiency being given by the ratios of the energies of the initial laser state and of the laser quantum and is 41% for the 10.6 micron transition.

One of the best known atmospheric transmission windows lies in the near-infrared between 3 and 5 microns. Because of the low background in this region and because relatively efficient photodetectors exist for these wavelengths, many present-day infrared optical systems operate in this region. Several coherent sources are available which operate in the region between 3 and 5 microns, but most of these are low-power devices. The 3.39 micron line of the helium-neon laser, for example, gives only very low-power outputs on the order of a few milliwatts, and the alignment problems associated with this laser system prevent its use in an airborne system. Harmonic generation of carbon dioxide laser radiation can be used to generate coherent radiation at several wavelengths in the region of 3 to 5 microns; however harmonic generation at such long wavelengths is an inherently inefficient process and few harmonic generating materials have yet been discovered. Finally, parametric processes can be used to downconvert ruby or neodymium laser radiation to this region, but such processes have not as yet been made very efficient and the optical alignment problems for parametric processes are severe.

SUMMARY OF THE INVENTION

In accordance with the present invention, there is provided a water vapor-hydrogen deuteride system which will emit coherent radiation in the range of 3 to 5 microns, and specifically at 4.6 microns. The laser of the invention operates under the same principles as the carbon dioxide-nitrogen laser and, therefore, exhibits many of the same highly desirable properties as the carbon dioxide-nitrogen laser. Included among these properties are continuous wave operation with high power output capability, relative ease of construction and excitation and, most important of all, high overall efficiency.

In a specific embodiment of the invention, there is provided a laser for producing coherent radiation comprising (1) a pair of spaced-apart reflectors forming a resonant cavity for reflecting coherent radiation, (2) an envelope disposed between the mirrors and having transparent end windows, (3) a gaseous mixture of water vapor and hydrogen deuteride within the envelope, and (4) means for exciting the mixture of water vapor and hydrogen deuteride by electrical energy to raise the hydrogen deuteride to its first metastable state, thereby to induce laser emission by vibrationally exciting the water vapor molecules. The partial pressure of water vapor is preferably about 0.05 to 0.10 Torr and that of hydrogen deuteride about 0.05 Torr.

The above and other objects and features of the invention will become apparent from the following detailed description taken in connection with the accompanying drawings which form a part of this specification, and in which.

Figure 1:
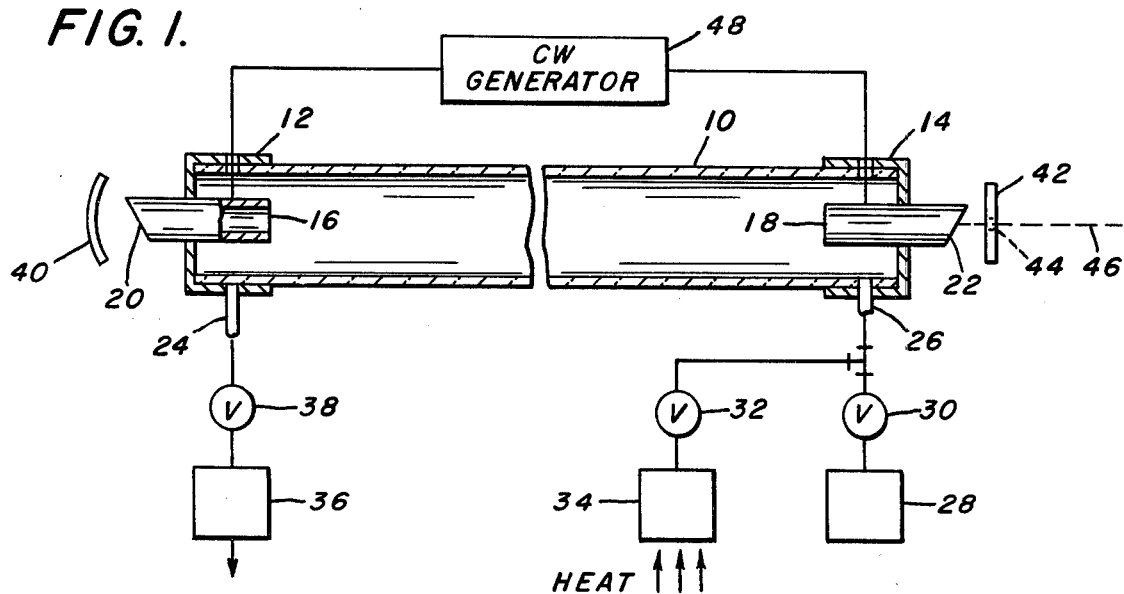
FIG. 1 is a schematic diagram of the laser system of the invention.

With reference now to the drawings, and particularly to FIG. 1, the apparatus shown includes a quartz tube 10 typically having an overall length of about 160 centimeters and an inner diameter of 3 centimeters. The tube has square-cut ends and is fitted with metal end caps 12 and 14. Extending through the end caps 12 and 14 are cylindrical or tubular electrode members 16 and 18 fitted at their outer ends with Brewster angle sodium chloride windows 20 and 22, respectively, although other window materials can also be used. The end caps 12 and 14 also contain the ports 24 and 26 for gas flow. Hydrogen deuteride is supplied from a source 28 to the port 26 through valve 30. The vapor is supplied through valve 32 to the same port 26. The source of water vapor 34 preferably comprises a distillation flask filled with deionized, double-distilled water. Heat, schematically illustrated by the arrows in FIG. 1, is applied to the flask 34 to generate the water vapor which flows into the tube 10. A vacuum pump 36 is connected to port 24 at the other end of the tube 10 through valve 38.

Adjacent the Brewster angle window 20 is a curved mirror 40 and adjacent the other Brewster angle window 22 is a flat mirror 42 provided with an opening 44 through which a laser beam 46 may pass. The electrodes 16 and 18 are connected to a continuous wave generator 48 as shown.

In order to effect laser action, the valves 30 and 32 are opened, valve 38 is also opened and pump 36 is actuated to thereby fill the tube 10 with a mixture of water vapor and hydrogen deuteride with the partial pressure of water vapor being about 0.05 to 0.10 Torr and that of hydrogen deuteride about 0.05 Torr. After the tube 10 is evacuated of air and filled with the mixture of gases, all valves 30, 32 and 38 are closed and the CW generator 48 is actuated to establish a potential between the electrodes 16 and 18. Under 60-hertz alternating current discharge conditions provided by generator 48, molecular vibrations are excited in the hydrogen deuteride; and this vibrational energy is stored until, by means of near-resonant energy exchange collisions, it is transferred to the active laser water molecule whereby the population of the upper level of an optically-connected pair of energy levels of water vapor molecules equals or exceeds the population of a lower level of the pair. Coherent emission is then obtained by return of the population to an equilibrium distribution. In addition to alternating current excitation, the system of the invention will also operate under direct current or pulsed excitation.

Figure 2:
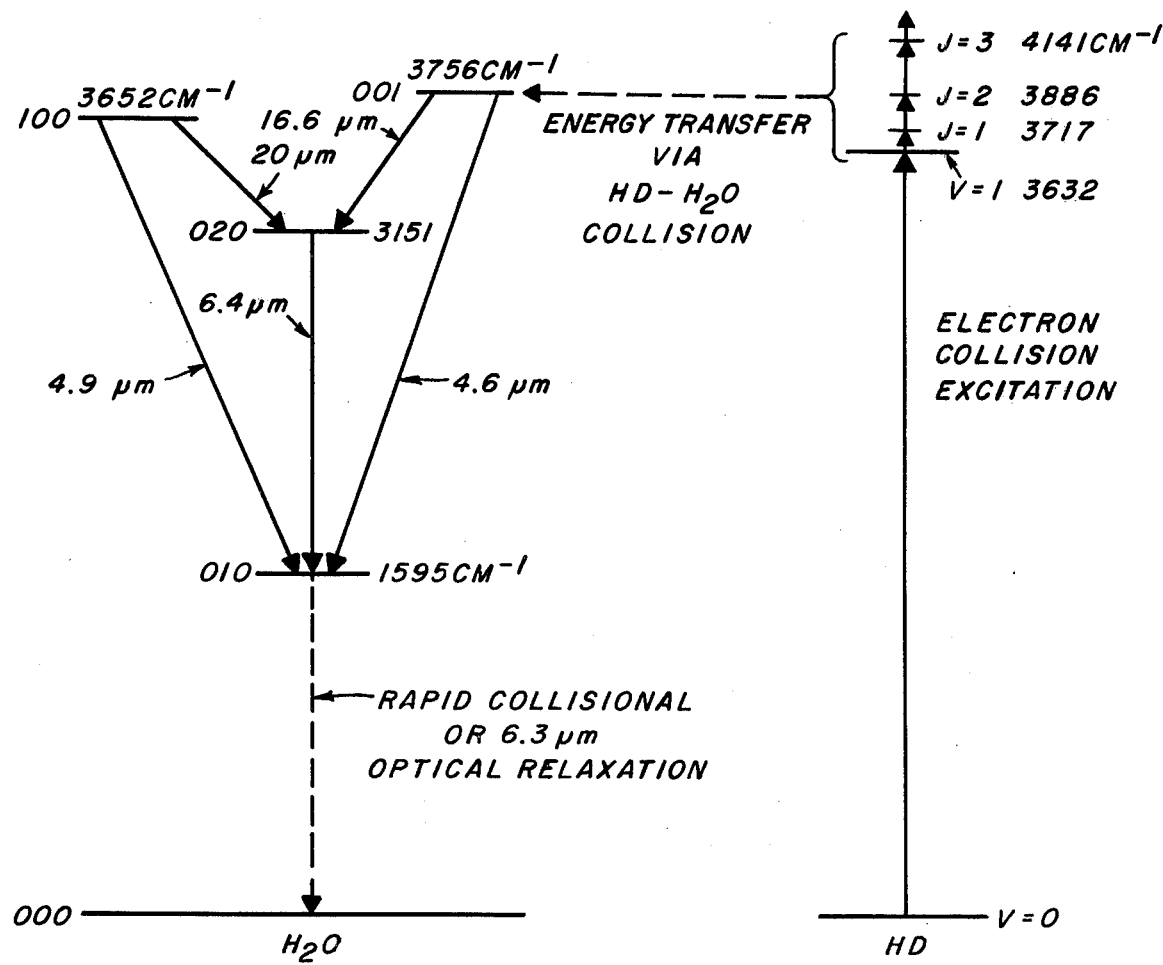
FIG. 2 is a vibrational energy level diagram of a water vapor-hydrogen deuteride system.

The operation of the laser system of the invention can be understood from the vibrational energy level diagram for water vapor and hydrogen deuteride shown in FIG. 2 where only the lower lying vibrational states are indicated. Water vapor is a non-linear asymmetrical molecule with three degrees of vibrational freedom. The fundamental vibrational modes are similar to those of carbon dioxide and the same nomenclature can be used to describe them. The energy values for the states under consideration are 100 at 3652 cm$^{-1}$, 010 at 1595 cm$^{-1}$, 020 at 3151 cm$^{-1}$ and 100 at 3756 cm$^{-1}$.

Unlike the case of carbon dioxide, all of the transitions in the water molecule are allowed by the selection rules. The relative transition probabilities can be inferred to some extent by the magnitude of the change in dipole moment associated with each transition. Thus, the transition from state 000 to state 001 involves a considerably greater dipole moment change than does the 000 to 100 transition and can be expected to have a higher probability of occurring. In an electric discharge in pure water vapor, collisions with electrons can be expected to excite all of the molecular vibrations, but the excitation rates should roughly follow the optical transition probabilities. On this basis, it can be expected that excitation of the 010 and 001 states should occur most readily and at roughly equal rates, with the 001 state slightly favored. It is unlikely, therefore, that any appreciable population inversion can be achieved between the 001 and 010 states in a pure water vapor discharge. That laser action occurs between 001 and 020 states in a water vapor discharge and not between the 001 and 010 states supports this contention.

The 010 state of water vapor is known, however, to be extremely short-lived, meaning that it is possible to achieve a population inversion by means of an energy transfer interaction which would preferentially populate the 001 or 100 state. Hydrogen deuteride forms homonuclear diatomic molecules which are subject to the same radiation restrictions as the nitrogen molecule. As a result, once they are vibrationally excited, they must relax via collisional deactivation. The first vibrational state of hydrogen deuteride lies at 3632 cm$^{-1}$, or very close to that of the 100 and 001 states of water vapor which are at 3652 cm$^{-1}$ and 3756 cm$^{-1}$, respectively.

FIG. 2 shows the first four rotational levels (J = 0, 1, 2, 3) of the $v = 1$ state of hydrogen deuteride. It can be seen that the J = 0 state lies very close to the energy of the 100 state of water vapor; while the J = 1 and J = 2 states lie closer to the 001 state of water vapor. The reason for inclusion of these rotational states lies in the fact that a Boltzmann distribution of rotational state populations is set up in equilibrium with the translational temperature of a gas within times of the order of $10^{-7}$ second or less after excitation of the molecule to the $v = 1$ state, and that this distribution is maintained throughout the lifetime of the vibrational state. The importance of this is illustrated in the following Table I which gives the rotational state population distributions for a system temperature of 400° K, a rotational-translational temperature which might be expected in a low-pressure discharge. The following Table I shows that some 60.9% of the excited hydrogen deuteride molecules will be found in either the J = 1 or J = 2 state which are more nearly in resonance with the 001 state than with the 100 state of water vapor.

TABLE I

ROTATIONAL POPULATIONS AND E VALUES FOR HD-H$_2$O AT 400° K

| J | E (v, J) | $\Delta E_{100}$ | $\Delta E_{001}$ | Population |
|---|---|---|---|---|
| 0 | 3632 cm$^{-1}$ | −20 cm$^{-1}$ | −124 cm$^{-1}$ | 14.48% |
| 1 | 3717 | +65 | −39 | 31.97 |
| 2 | 3886 | +234 | +130 | 28.90 |
| 3 | 4141 | +489 | +375 | 16.26 |
| 4 | 4477 | 825 | 721 | 8.4 |

From the foregoing, it is apparent that energy transfer from hydrogen deuteride to water vapor will favor population of the 001 state.

Transitions from the 001 state of water vapor (FIG. 2) to any of the three lower lying states are allowed, so that laser action is possible for all three. The 001 to 010 transition, however, is the most probable of the three to give the desired 4.6 micron emission and, in fact, this proves to be the case in actual practice.

The power handling capability of any laser system is limited by the rates at which the terminal state is depopulated and the active species is made ready to be pumped again. The 010 state of water vapor has an extremely fast intrinsic relaxation rate lying between $10^{-11}$ and $10^{-10}$ cm$^3$ part$^{-1}$ sec$^{-1}$. Thus, the terminal level of the laser of the invention becomes depopulated, without added gases, very rapidly. In this respect, and in contrast to the CO$_2$—N$_2$ laser, additions of noble gases actually decrease efficiency. The efficiency of the laser shown herein depends upon the excitation efficiency and the ratio of the initial and final state energies. The maximum theoretical efficiency is 58% as compared, for example, to 41% in a carbon dioxide laser.

The present invention thus provides a high power, highly efficient laser system which exhibits laser action at 4.6 microns. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A laser for producing coherent radiation comprising a pair of spaced-apart reflectors forming a resonant cavity for reflecting coherent radiation, an envelope disposed between the mirrors and having transparent end windows adjacent the mirrors, a gaseous mixture of water vapor and hydrogen deuteride within the envelope, and means for exciting the gas mixture by electrical energy to raise the hydrogen deuteride to its first metastable state, whereby laser emission is induced by vibrationally exciting the water vapor molecules.

2. The laser of claim 1 wherein the coherent radiation produced thereby has a wavelength of 4.6 microns.

3. The laser of claim 1 wherein one of said spaced-apart reflectors is totally reflecting and the other is partially reflecting only.

4. The laser of claim 3 wherein said partially reflecting reflector is provided with an opening therein through which a beam of coherent radiation passes.

5. The laser of claim 1 wherein said light transmitting windows at the ends of said envelope comprise Brewster angle windows.

6. The laser of claim 1 wherein said means for exciting the gas mixture by electrical energy comprises electrodes at said opposite ends of said envelope, and means for establishing an alternating current potential between said electrodes.

* * * * *